US008555721B2

(12) United States Patent
Taillet

(10) Patent No.: US 8,555,721 B2
(45) Date of Patent: Oct. 15, 2013

(54) SOUND MEASURING DEVICE

(76) Inventor: Scott Taillet, Lake in the Hills, IL (US)

(*) Notice: Subject to any disclaimer, the term of this patent is extended or adjusted under 35 U.S.C. 154(b) by 472 days.

(21) Appl. No.: 12/345,291

(22) Filed: Dec. 29, 2008

(65) Prior Publication Data
US 2009/0188322 A1 Jul. 30, 2009

Related U.S. Application Data

(60) Provisional application No. 61/009,290, filed on Dec. 27, 2007.

(51) Int. Cl.
G01H 1/00 (2006.01)

(52) U.S. Cl.
USPC .............................................. 73/579; 367/119

(58) Field of Classification Search
USPC .............. 73/587, 645, 646, 647, 648; 367/99, 367/119
See application file for complete search history.

(56) References Cited

U.S. PATENT DOCUMENTS

| 3,661,224 | A | * | 5/1972 | Allen et al. | 73/647 |
| 3,696,206 | A | * | 10/1972 | Ida et al. | 73/646 |
| 3,778,552 | A | * | 12/1973 | Edinborgh | 73/645 |
| 3,802,535 | A | * | 4/1974 | Peake et al. | 73/646 |
| 3,844,175 | A | | 10/1974 | Hixson | |
| 4,179,937 | A | * | 12/1979 | Koblanski | 73/646 |
| 4,257,273 | A | * | 3/1981 | Knowd | 73/647 |
| 4,277,980 | A | | 7/1981 | Coats et al. | |
| 4,287,771 | A | * | 9/1981 | Dugot | 73/647 |
| 4,424,511 | A | | 1/1984 | Alberts | |
| 4,509,189 | A | | 4/1985 | Simpson | |
| 4,563,274 | A | * | 1/1986 | Rothon et al. | 210/101 |
| 4,575,829 | A | * | 3/1986 | Duhe | 367/129 |
| 4,581,726 | A | * | 4/1986 | Makino et al. | 267/99 |
| 4,739,860 | A | * | 4/1988 | Kobayashi et al. | 181/123 |
| 5,365,219 | A | | 11/1994 | Wong et al. | |
| 5,636,287 | A | * | 6/1997 | Kubli et al. | 381/71.2 |
| 5,763,882 | A | | 6/1998 | Klapper et al. | |
| 6,035,719 | A | * | 3/2000 | Toyota | 73/649 |
| 6,041,657 | A | * | 3/2000 | Sutherland | 73/646 |
| 6,084,973 | A | * | 7/2000 | Green et al. | 381/92 |
| 6,380,974 | B1 | | 4/2002 | Hieda et al. | |
| 6,434,239 | B1 | * | 8/2002 | DeLuca | 381/71.2 |
| 6,504,490 | B2 | | 1/2003 | Mizushima | |
| 6,686,839 | B2 | * | 2/2004 | Chou et al. | 340/540 |
| 6,798,374 | B1 | * | 9/2004 | Smith | 342/109 |
| 6,997,057 | B2 | * | 2/2006 | Noel | 73/647 |
| 7,046,015 | B2 | | 5/2006 | Suginouchi et al. | |
| 7,075,626 | B2 | | 7/2006 | Schmidt et al. | |

(Continued)

Primary Examiner — Peter Macchiarolo
Assistant Examiner — Samir M Shah
(74) Attorney, Agent, or Firm — Erickson Law Group, PC

(57) ABSTRACT

A device for measuring, documenting, and issuing citations for noise violations comprises a mobile device for measuring the decibel sound level from a sound source, for measuring the distance from the device to the source, for capturing an image or video of the sound source, and determining whether the sound source exceeds a user-predetermined level. The device may be in the form of a hand-held gun-shaped device wherein the user actuates the trigger to record an image or video of the sound source, the decibel sound level, and the distance between the device and the source. After the data is collected, the sound-measuring device is attached to a download component. The download component accepts data from the sound-measuring component and allows the user to input additional data regarding the noise violation. The user may then use the download component to print a citation, which may include an image of the sound source.

12 Claims, 6 Drawing Sheets

(56) References Cited

U.S. PATENT DOCUMENTS

| | | | |
|---|---|---|---|
| 7,151,835 B2 | 12/2006 | Yonovitz et al. | |
| 7,194,204 B2 | 3/2007 | Gordon | |
| 7,305,886 B2 * | 12/2007 | Radcliffe | 73/647 |
| 7,369,955 B2 * | 5/2008 | Lee | 702/81 |
| 7,389,158 B2 * | 6/2008 | Desrochers et al. | 700/277 |
| 7,415,670 B2 | 8/2008 | Hull et al. | |
| 7,437,274 B2 * | 10/2008 | Charette et al. | 702/184 |
| 7,882,743 B2 * | 2/2011 | Goldberg et al. | 73/647 |
| 2003/0154054 A1 * | 8/2003 | Charette et al. | 702/188 |
| 2004/0094621 A1 | 5/2004 | LaMont | |
| 2004/0194549 A1 | 10/2004 | Noel | |
| 2005/0041529 A1 * | 2/2005 | Schliep et al. | 367/99 |
| 2006/0000282 A1 | 1/2006 | Radcliffe | |
| 2006/0119473 A1 | 6/2006 | Gunderson et al. | |
| 2006/0198537 A1 * | 9/2006 | Moorer | 381/92 |
| 2006/0219015 A1 | 10/2006 | Kardous | |
| 2007/0017292 A1 | 1/2007 | Sper | |
| 2007/0180915 A1 | 8/2007 | Goldberg et al. | |

* cited by examiner

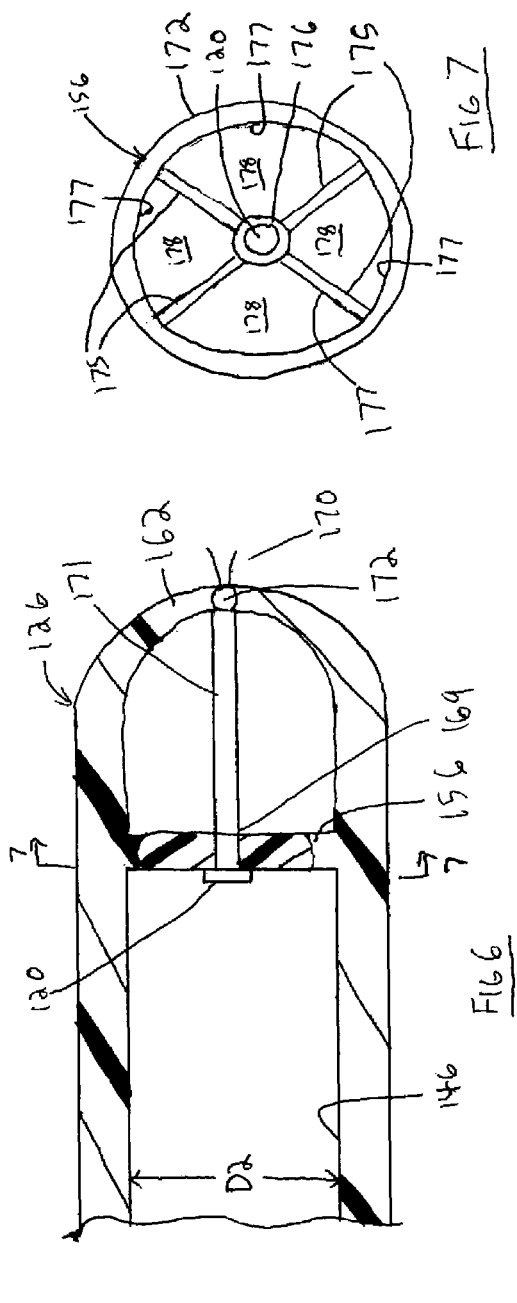
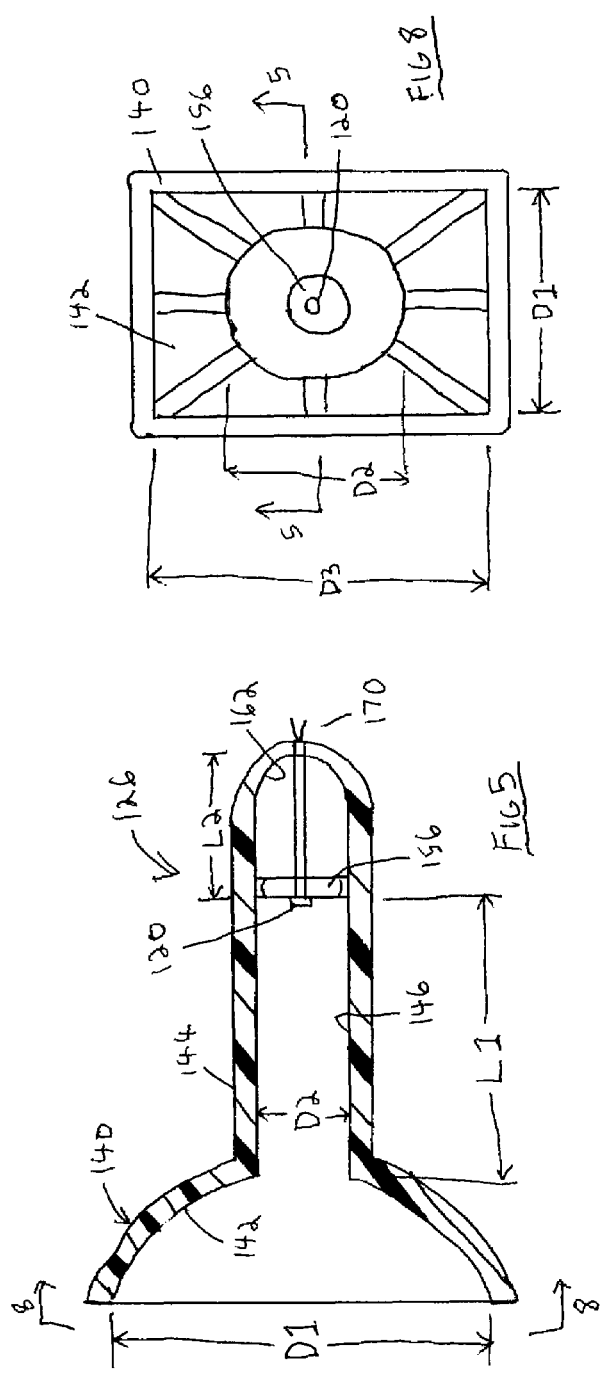

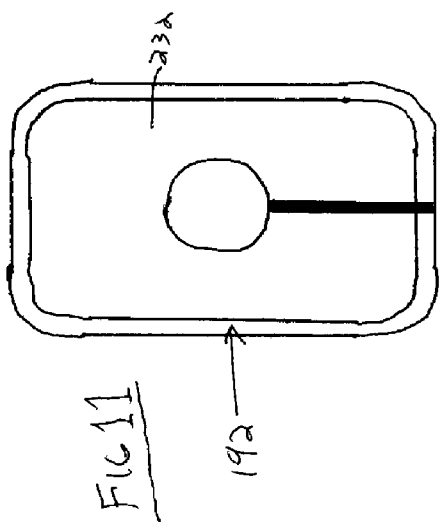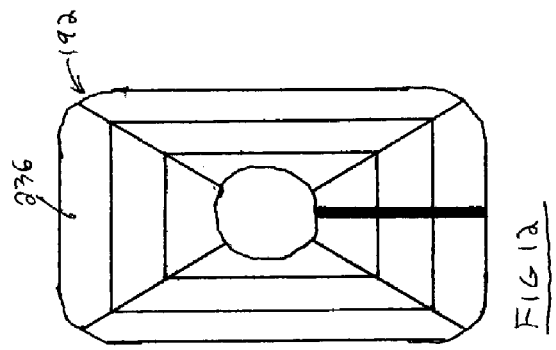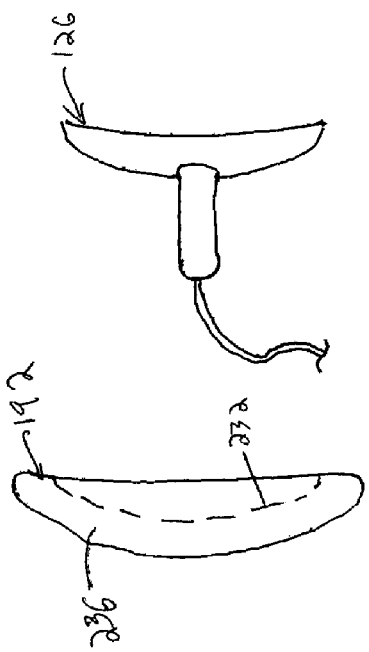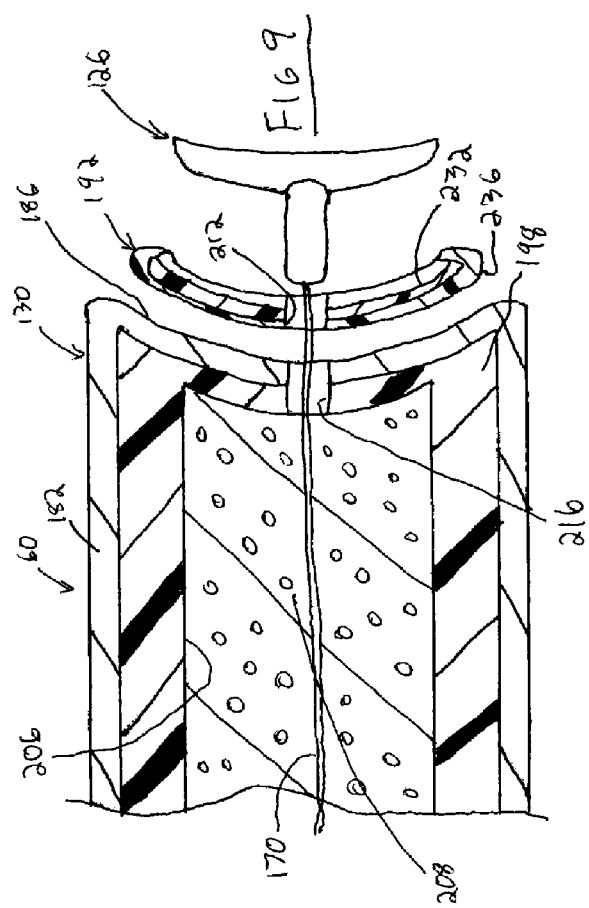

SOUND MEASURING DEVICE

This application claims the benefit of U.S. Provisional Application Ser. No. 61/009,290, filed Dec. 27, 2007.

TECHNICAL FIELD OF THE INVENTION

The present invention relates to an apparatus for measuring a decibel sound level, particularly to enforce community noise level standards or laws.

BACKGROUND OF THE INVENTION

Many local municipalities and other units of government have enacted laws to regulate activities, such as noise pollution, which may have a harmful effect on the public. Loud engines from vehicles or machinery may detract from the enjoyment of neighborhoods by generating excessive noise. In addition, loud automobile stereos, household sound generating devices, or loud parties may likewise disturb the neighborhood peace. Such engines, stereos, and activities may be particularly disturbing during evening hours. As a result, many units of government have enacted legislation setting noise level standards.

Devices mounted or placed at or near the roadside for monitoring noise violations are known and disclosed in U.S. Pat. No. 4,287,771, U.S. Patent Application 2004/0194549, and U.S. Patent Application 2002/0011939. Several inventions in the prior art appear to disclose mobile or personal sound measuring devices such as those found in U.S. Pat. No. 7,151,835, U.S. Pat. No. 4,277,980, U.S. Patent Application 2007/0017292, U.S. Patent Application 2007/0180915, and U.S. Patent Application 2006/0219015.

However, the present inventor recognizes a need for a mobile sound-measuring device, which is reliable, accurate and easy-to-operate. Also, the present inventor recognizes the need for a device that law enforcement personnel can utilize to quickly measure decibel sound levels, measure the distance from the sound source, and determine whether a noise level standard law is being violated. Further the present inventor recognizes the need for such a device to easily document the violation and generate a citation or ticket.

SUMMARY OF THE INVENTION

The present invention provides a device for measuring, documenting, and issuing citations for noise violations. The present invention comprises a mobile device for measuring the decibel sound level from a sound source, measuring the distance from the device to the source, capturing an image or video of the sound source, and determining whether the sound source exceeds a user-predetermined level. The invention may be in the form of a hand-held gun-shaped device wherein the user actuates the trigger to record an image or video of the sound source, the decibel sound level, and the distance between the device and the source. The device may collect data at a single moment when actuated by the user, or may continuously record data over a period of time.

After the data is collected, the sound-measuring component is attached to a download and printer component. The download component accepts data from the sound-measuring component and allows the user to input additional data regarding the noise violation. The user may then use the download component to print a citation, which may include an image of the sound source.

Numerous other advantages and features of the present invention will become readily apparent from the following detailed description of the invention and the embodiments thereof, and from the accompanying drawings.

BRIEF DESCRIPTION OF THE DRAWINGS

FIG. 5 is a cross-sectional view of an ear piece housing taken generally along line 5-5 of FIG. 8;

FIG. 6 is a enlarged cross-sectional view of the ear piece housing taken from FIG. 5;

FIG. 7 is front view of a grommet taken from FIG. 6;

FIG. 8 is a front view of an ear piece housing taken generally along line 8-8 of FIG. 5;

FIG. 9 is a sectional view taken generally along line 9-9 of FIG. 1;

FIG. 10 is an exploded side view of an insulation gasket and the ear piece housing taken from FIG. 9;

FIG. 11 is a front view of the insulation gasket of FIG. 10; and

FIG. 12 is a rear view of the insulation gasket of FIG. 10.

DETAILED DESCRIPTION OF THE PREFERRED EMBODIMENTS

Figure 1:
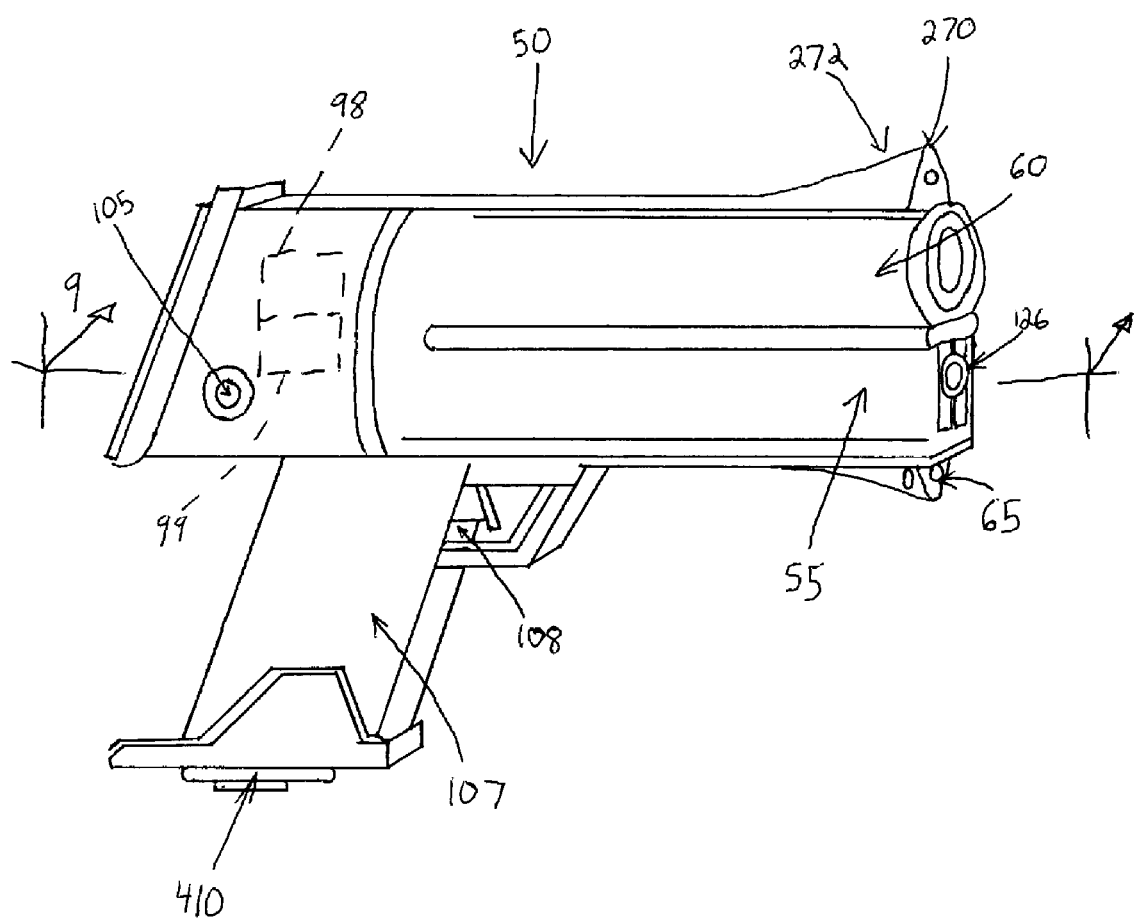
FIG. 1 is a side view of a sound-measuring component of the present invention.

While this invention is susceptible of embodiment in many different forms, there are shown in the drawings, and will be described herein in detail, specific embodiments of the invention with the understanding that the present disclosure is to be considered as an exemplification of the principles of the invention and is not intended to limit the invention to the specific embodiments illustrated.

Figure 2:
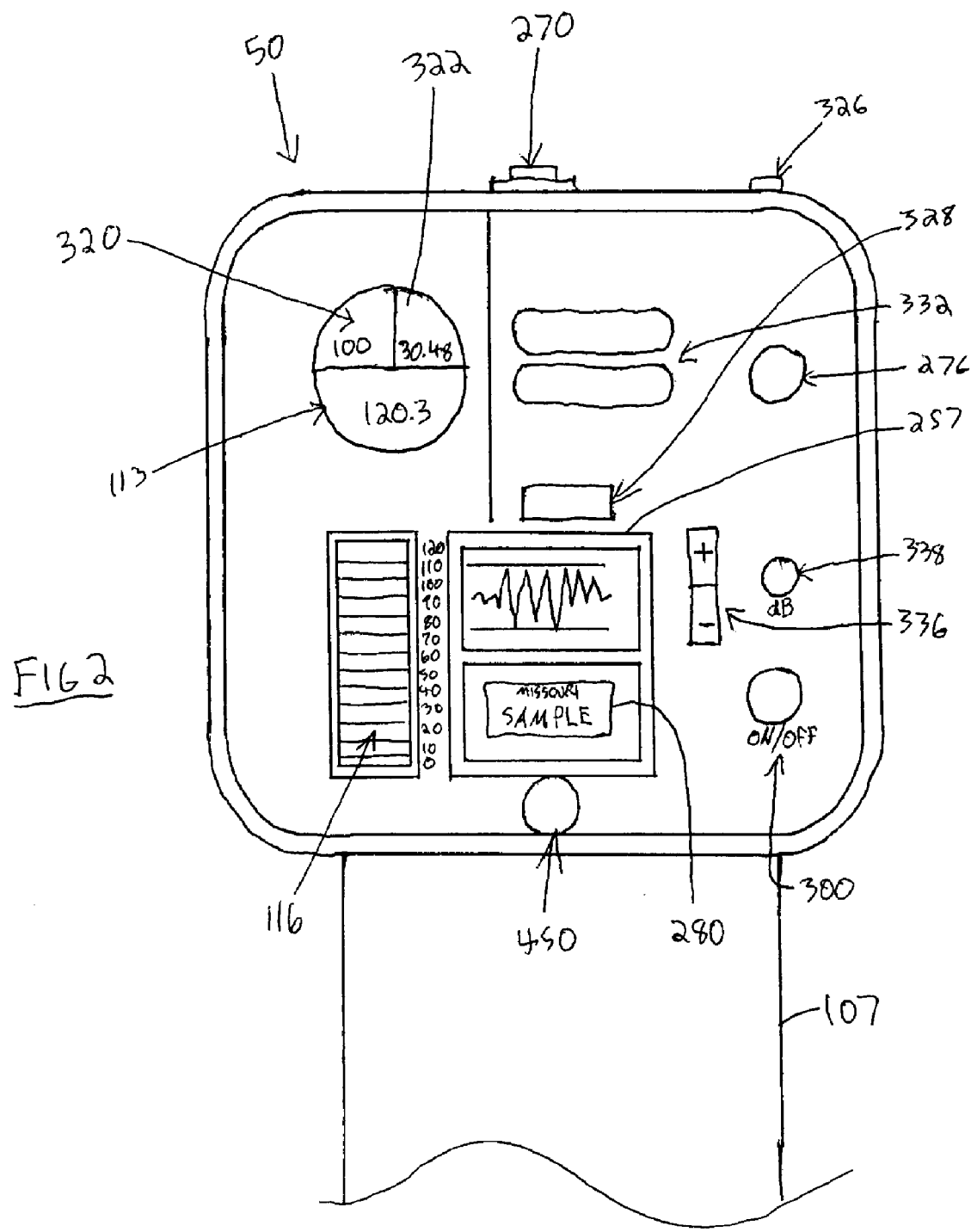
FIG. 2 is a fragmentary rear view of the sound-measuring component shown in FIG. 1.
Figure 3:
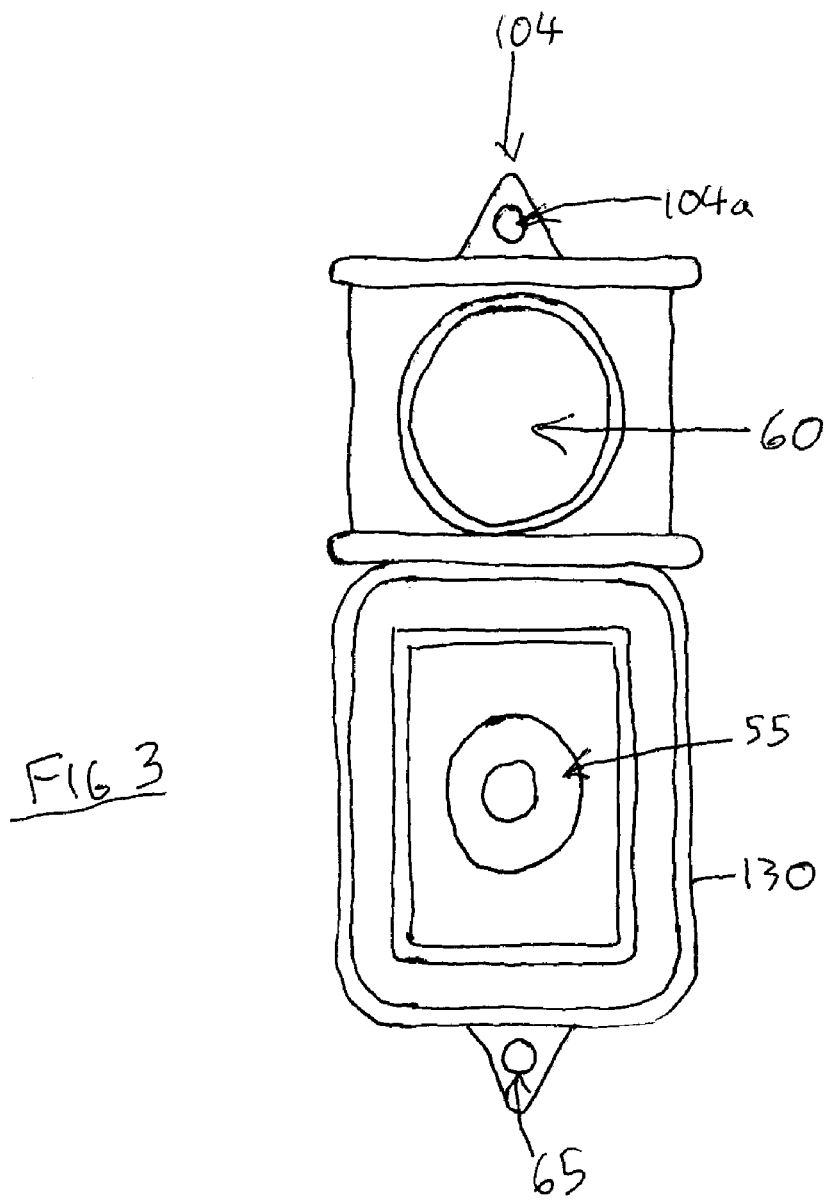
FIG. 3 is a front view of the sound-measuring component shown in FIG. 1.

FIGS. 1-3 illustrate an exemplary sound-measuring device 50 in accord with the present invention. The device 50 shown in FIG. 1 comprises a sound-measuring component 55, an image and/or video capturing component 60, a distance-measuring component 65, internal functional circuitry 98 for analyzing, and a memory 99 for storing, the data received by the various components of the device 50.

Generally, the device 50 is held by a handgrip 107. The user activates the sound-measuring component 55, the image and/or video capturing component 60, and the distance-measuring component 65 by pulling a trigger 108.

While the embodiment shown in FIG. 1 is a handheld version the device 50 in the form of a gun-shaped device, other embodiments of the invention could provide for the device to be mounted to a stationary object like a building or a mobile object like a vehicle.

The sound-measuring component 55 of the device 50 may comprise a device capable of measuring sound and converting the sound into digital data, and such data capable of being ultimately converted into the decibel measure of sound. The decibel representation is then capable of being displayed to the user on a decibel display panel 113, or a decibel bar scale display 116. Such a sound-measuring component may include those disclosed in U.S. Patent Application 20070017292 and U.S. Pat. No. 4,277,980, which are herein incorporated by reference.

In one embodiment, the sound-measuring component 55 receives a sound pressure wave through a microphone 120

(FIG. 5) and processes the resultant electrical signals through the functional circuitry 98 into groups of digital pulses. These digital pulses are recorded in the device's internal memory 99 and simultaneously displayed on the decibel bar scale display 116 to the user on the back of the device 50.

The microphone 120 is fitted in an ear piece housing 126 as shown in detail in FIGS. 5-8. The ear piece housing 126 is fitted in the sound-measuring component 55 of the device 50 by a tubular housing 130 as shown in FIGS. 3 and 9.

FIG. 5 shows a cross-sectional view of the ear piece housing 126. The ear piece housing 126 is designed, sized and shaped to simulate an average human ear such that sound received by the microphone will resemble the sound received in a human ear. The ear piece housing and microphone can be calibrated to sense within a frequency range corresponding to human hearing, starting at about 18-20 Hz. The ear piece housing 126 includes a sound collecting funnel 140 having a concave inside surface 142, connected to a tube 144 having an axial passage or tunnel 146 therethrough. The surface 142 is open into the tunnel 146. The microphone 120 is surrounded and held by a grommet 156. The grommet 156 is fitted within the inner tunnel 146 at a distance L2 of about 0.5 cm from a concave back wall 162 that substantially closes the tunnel 146. Microphone wires 170 run from the back of the microphone 120 through a tube 171 and through a small opening in the back wall 162 of the ear piece housing 126. Grommets or gaskets can be provided at 169, 172 to guide the wires 170, especially if a tube 171 is not used. The ear piece housing 126 may be made out of medical plastic. The ear piece housing 126 can be dipped into a Teflon bath and baked on to simulate the acoustic properties of the average human ear.

To simulate the size, relative shaping and volume of the human ear, the following approximate dimensions, shown in the Figures, are used: D1=2 cm, D2=1 cm, D3=2.5 cm, L1=2.5 cm and L2=0.5 cm.

The grommet 156 includes an annular rim 172 fixed to a raised annular boss 173 inside the tunnel 146. The rim 172 is connected by four spokes 175 to a small base ring 176 that holds the microphone 120. The otherwise open, pie-piece-shaped areas 177 between spokes 175 can be covered with a thin, elastic membrane 178, such as a latex rubber film or membrane, to further simulate the internal environment of the human ear.

FIG. 9 shows the ear piece housing 126 fitted into the sound-measuring component 55 of the device 50 by the tubular housing 130. The tubular housing 130 comprises a metal tube 182 and a concave end wall 186. An insulating gasket 192 is placed between the concave end wall 186 and the ear piece housing 126. The metal tube 182 is covered on the inside by a rubberized plastic sleeve 198. The rubberized plastic sleeve 198 does not fill the entire area in the tube, a hollow area 206 remains. The hollow area 206 is filled with a foam core 208 after the wires 170 are run to the functional circuitry 98. The tube 144 is inserted through an insulation gasket center hole 212 and a concave end wall center hole 216.

The insulating gasket 192 fits between the ear piece housing 126 and the end wall 186. The insulating gasket 192 is concave to conform to the ear piece housing 126. An inner portion 232 of the concave insulating gasket 192 is made of foam and an outer portion 236 is made of rubberized plastic. The concave insulating gasket 192 is attached to the ear piece housing 126 and fits between the ear piece housing 126 and the end wall 186. The insulating gasket 192 is bendable and can comprise a cut slit 242 for ease of installation.

The internal memory 99 may consist of non-volatile memory such as flash memory. The decibel level may be displayed on a decibel bar scale display 116 and/or as a digital number on a decibel display panel 113, such as a liquid crystal display. The device 50 may also contain a sound amplitude display 252 for displaying the amplitude of the sound wave received. In another embodiment, the system records the actual sound detected for later download to a download component 260, as described below.

The distance-measuring component 65 measures the distance between the device 50 and the sound source. The component 65 may make this measurement by laser, infrared, ultrasonic or other means. In one embodiment, the distance is measured by ultrasonic means, wherein an ultrasonic transmitter and an ultrasonic receiver are placed in the component 65. The component determines the distance between the device 50 and the sound source after measuring the time between when the ultrasonic signal is sent and when a reflected signal is received. Such an ultrasonic measuring system may be like that disclosed in U.S. Pat. No. 7,046,015, which is herein incorporated by reference.

In another embodiment, the distance between the device 50 and the sound source may be determined by the component 65 utilizing a laser range finder. Such a laser range finder may be like that disclosed in U.S. Pat. No. 7,075,626, which is herein incorporated by reference.

In one embodiment, the device 50 may calculate the sound level at various distances from the sound source. Based on the sound measurement and the distance measurement, the system can calculate the decibel sound level at either preset or user defined distances from the sound source, using known physics and mathematical principles and formulas.

The image-capturing component 60 may be a compact digital camera such as the one disclosed in U.S. Pat. No. 7,194,204, which is herein incorporated by reference. The device 50 may optionally include a flash 270 mounted in a sight 272, which the user can enable or disable using a flash enabling switch 276. The sight 272 may be used to aim the device 50 toward the sound source.

The image-capturing component 60 may also be a digital video camera, such as disclosed in U.S. Pat. No. 6,380,974, which is herein incorporated by reference. A display 280 may be included on the back of the device 50, where, at the user's option, a continuous video image from the image-capturing component 60 is shown in order for the user to aim the sound-measuring device 50 toward the target and ensure the proper image is captured. In another embodiment, the image-capturing component 60 may be capable of recording a live video stream. In a further embodiment, the image-capturing component 60 may be capable of capturing images or video in low-light conditions. Such an image-capturing component 60 is commonly known as a night-vision camera like that disclosed in U.S. Pat. No. 5,763,882, which is herein incorporated by reference.

The user starts the device 50 by pressing a power button 300. An energy storage device such as a battery, optionally located in the handgrip 107, powers the device 50. A cord connected to a power source could also power the device 50. The user points the device 50 toward the sound source and presses the trigger 108 to capture the decibel sound level, an image of the sound source, and the distance between the device 50 and the sound source. The decibel level, the image of the sound source, and the distance between the device 50 and the sound source is displayed on the back of the device 50 and recorded in the device's internal memory 99. The distance may be displayed on a display panel in English units of measure 320 and/or metric units of measure 322.

In another embodiment, the device 50 begins recording the decibel sound level, images or continuous video of the sound source, and the distance between the device 50 and the sound source when the trigger 108 is pulled and continues recording that data until the trigger 108 is pulled for a second time. The data is displayed on the back of the device 50 and is recorded on the devices internal memory 99. In one embodiment, the sound-measuring component may only save data if the decibel sound level is above a user-predefined level. In a further embodiment, the user may optionally disable the image-capturing component, or may operate the image-capturing component independent of the sound-measuring component using a camera button 326, or may switch the function of the trigger between image-capturing component activation and sound-measuring component activation using a toggle button 328.

In a further embodiment, the device 50 has a continuous or regular self-testing function where the device 50 determines whether the sound-measuring and distance-measuring components are properly calibrated. The device 50 informs the user, through for example, status indicator lights 332, whether the device 50 is properly calibrated. The device 50 may be recalibrated using the calibration buttons 336 and 338.

Figure 4:
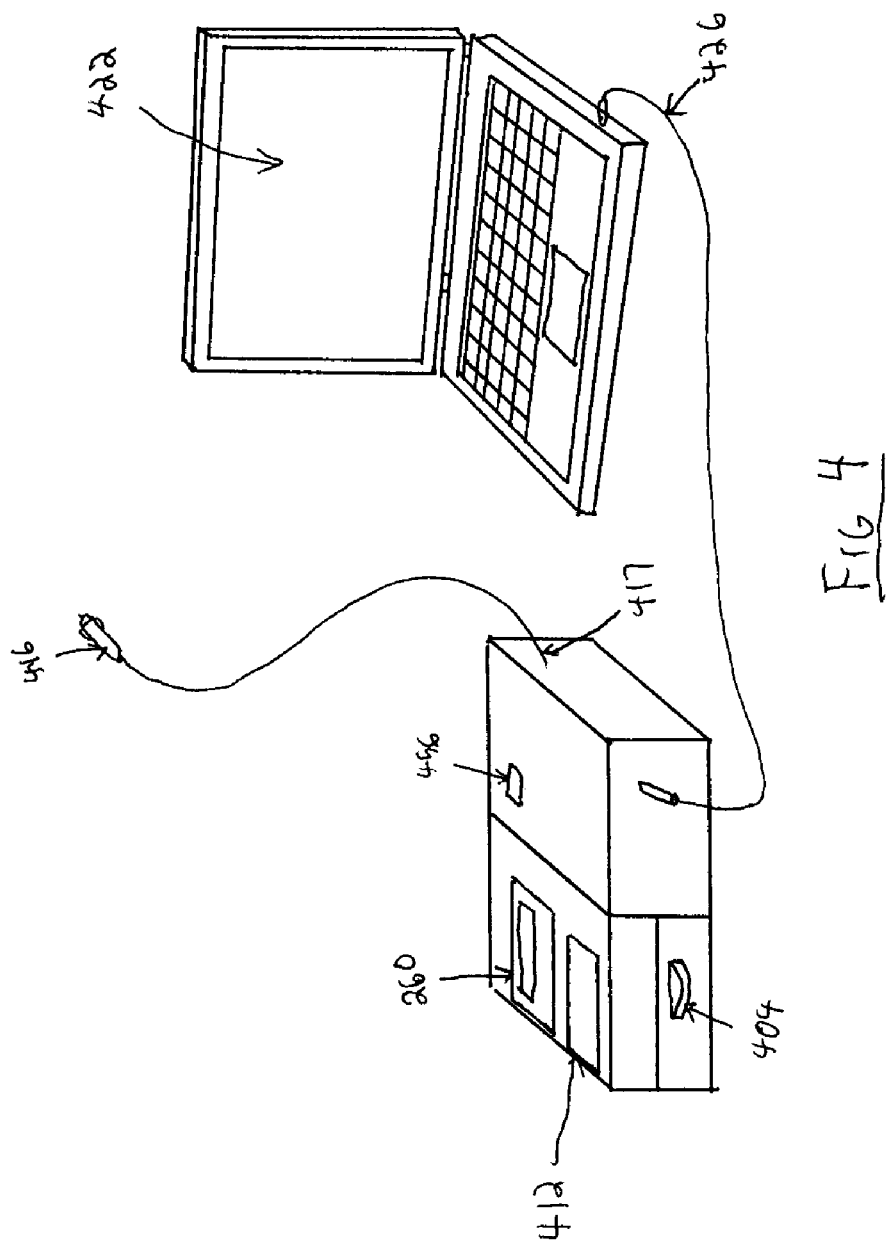
FIG. 4 is a perspective view of a download and printer component for use with the sound-measuring component of FIG. 1.

The invention also includes the downloading and printing component 260 as shown in FIG. 4. The user connects the sound-measuring device 50 via a connection port 410 (FIG. 1) to the docking port 412 on the download component 260. When the sound-measuring device 50 is connected, the download component 260 may automatically download the data from the sound-measuring device 50, optionally the device 50 or the download component 260 may be configured to require the user to manually start the download after connection. A cord 416 connects a power input 417 to a power source, such as an automobile cigarette lighter outlet, powers the download component 260. In one embodiment, when the sound-measuring device 50 is connected to the download component 260, the batteries in the sound-measuring device 50 will be charged by connection to the download component 260.

After downloading the data from the sound-measuring device 50, the download component 260 is capable of printing citations or tickets. The download component 260 is capable of printing clean and clear photos and may comprise an inkjet printer as disclosed in U.S. Pat. No. 7,264,326, which is herein incorporated by reference. The download component 260 may be connected to a computer 422 by a connection cable 426, or wirelessly. The user may input additional data via the computer 422. Alternatively, the download component 260 may include a keyboard and display where the user could input additional data without need of a computer 422. The tickets generated by the download component 260 contain data from the sound-measuring device 50, which may include the time and date, numeric representation of the decibel level (s) recorded, a graphical sound wave depiction on a graphed grid line background showing the recorded decibel level(s), if applicable a picture of the sound source, a picture of the license plate of an automobile sound source, and a picture of the vehicle's driver. The user may enter additional information such as, the offender's social security number, driver's license number, vehicle plate number and issuing state, driver's name, fine amount, and court date and time. After the download is complete the system may remove the data from the sound-measuring component's internal memory 99, or the user may clear the sound-measuring component's internal memory 99 using an eraser button 450 (FIG. 1).

In one embodiment, the download component 260 contains a function enabled by a print button 456 that allows the user to print or reprint all the tickets issued during a particular time period, such as a law enforcement officer's shift. The download component also may include a drawer for holding copies of previously issued tickets.

While the particular preferred and alternative embodiments to the present invention have been disclosed, it will be appreciated that many various modification and extensions of the above described technology may be implemented using the teaching of this invention.

The invention claimed is:

1. A handheld mobile device for measuring and recording a noise violation, comprising the handheld mobile device, which houses:
   a microphone arranged for measuring a decibel sound level from a sound source,
   a means for measuring a distance from the mobile device to the sound source,
   a camera arranged for capturing an image or a video of the sound source, and
   circuitry for determining whether the sound source exceeds a user-predetermined level that is dependent on the decibel sound level and the distance from the mobile device to the sound source, the handheld mobile device being capable of being manually supported by only one hand while the means for measuring the distance and the camera are aimed at the sound source.

2. The device according to claim 1, wherein said mobile device is in the form of a hand-held gun-shaped device, having a trigger, wherein the user actuates the trigger to record an image or video of the sound source, the decibel sound level, and the distance between the device and the sound source.

3. The device according to claim 2, wherein said device may collect data at a single moment when actuated by the user, or may continuously record data over a period of time.

4. The device according to claim 1, wherein said device may collect data at a single moment when actuated by the user, or may continuously record data over a period of time.

5. The device according to claim 4, further comprising a download and printer component, wherein after the data is collected, the sound-measuring component is attached to said download and printer component, wherein said download and printer component accepts the data from the mobile device and allows the user to input additional data regarding the noise violation, and wherein the user may then use the download and printer component to print a citation, which may include an image of the sound source.

6. A sound measuring device for use by law enforcement to determine noise violations, comprising:
   a handheld body having a hand grip with a trigger and a barrel the handheld body being sized to be manually supported by only one hand;
   a sound measuring component mounted on the barrel to receive sound from an external sound source when the barrel is aimed at the external sound source and to record a sound level of the received sound; and
   a distance measuring component mounted on the handheld body, and configured to determine a distance between the external sound source and the handheld body, and further configured to record the distance when the trigger is moved while the sound measuring component and the distance measuring component are supported in one hand and aimed at the external sound source.

7. The sound measuring device according to claim 6, further comprising an image capture component that captures an image of the external sound source and records the image.

8. The sound measuring device according to claim 6, wherein said sound measuring component comprises a microphone fitted into an earpiece housing, wherein said earpiece housing is sized and shaped to simulate an average human ear.

9. The sound measuring device according to claim 8, wherein said sound measuring device comprises a sound collecting funnel having a large open end and a small open end connected to a first open end of a tube that has a second open end connected to said earpiece housing, wherein sound collected in said funnel is transmitted through the tube and to the microphone in the earpiece housing.

10. The sound measuring device according to claim 6, comprising a display on a back side of the barrel that displays the decibel level of the external sound source and the distance.

11. The sound measuring device according to claim 6, wherein said handheld body holds a memory wherein said decibel level and distance are stored in said memory.

12. The sound measuring device according to claim 11, further comprising an image capture component that captures an image of the external sound source and records the image into said memory.

* * * * *